(12) United States Patent
Mugishima

(10) Patent No.: US 7,069,283 B2
(45) Date of Patent: Jun. 27, 2006

(54) METHOD AND CIRCUIT FOR CALCULATING MULTIPLE OF UNIT VALUE AND GENERATING A PERIODIC FUNCTION

(75) Inventor: Kozo Mugishima, Kanagawa (JP)

(73) Assignee: NEC Electronics Corporation, Kanagawa (JP)

(*) Notice: Subject to any disclaimer, the term of this patent is extended or adjusted under 35 U.S.C. 154(b) by 743 days.

(21) Appl. No.: 10/014,575

(22) Filed: Dec. 14, 2001

(65) Prior Publication Data
US 2002/0078111 A1 Jun. 20, 2002

(30) Foreign Application Priority Data
Dec. 14, 2000 (JP) .................................. 2000-380234

(51) Int. Cl.
*G06F 1/02* (2006.01)

(52) U.S. Cl. ........................................................ 708/270
(58) Field of Classification Search .......... 708/270–276
See application file for complete search history.

(56) References Cited

U.S. PATENT DOCUMENTS 4,668,923 A * 5/1987 Lofter ............................ 331/16
5,781,459 A * 7/1998 Bienz ............................ 708/271
5,808,493 A * 9/1998 Akiyama et al. ............. 327/159
6,088,800 A   7/2000 Jones et al.

FOREIGN PATENT DOCUMENTS

| EP | 0 312 370 | 4/1989 |
|----|-----------|--------|
| EP | 0 443 242 | 8/1991 |
| EP | 0 459 446 | 12/1991 |
| JP | A 55-150027 | 11/1980 |
| JP | A 2-196328 | 8/1990 |
| JP | 03-294916 | 12/1991 |
| JP | A 7-30373 | 1/1995 |
| JP | B2 7-43620 | 5/1995 |
| JP | A 2000-196690 | 7/2000 |
| JP | A 2000-215029 | 8/2000 |

* cited by examiner

*Primary Examiner*—Tan V. Mai
(74) *Attorney, Agent, or Firm*—Young & Thompson

(57) ABSTRACT

In order to generate a multiple of a unit U, N times U, by a digital circuit is provided, where U is a rational number and N is a natural number, the method comprises the following steps (1) to (5). (1) Where A, B and C are natural numbers, A>1, B>C and U=A+C/B, the values A, B and C are stored. (2) A multiple of A, N times A, and a multiple of C, N times C are generated. (3) The multiple of C is compared with the denominator B. (4) The multiple of A is modified according to the result of the comparing step (3). (5) The modified multiple of A is output as the multiple of U.

18 Claims, 11 Drawing Sheets

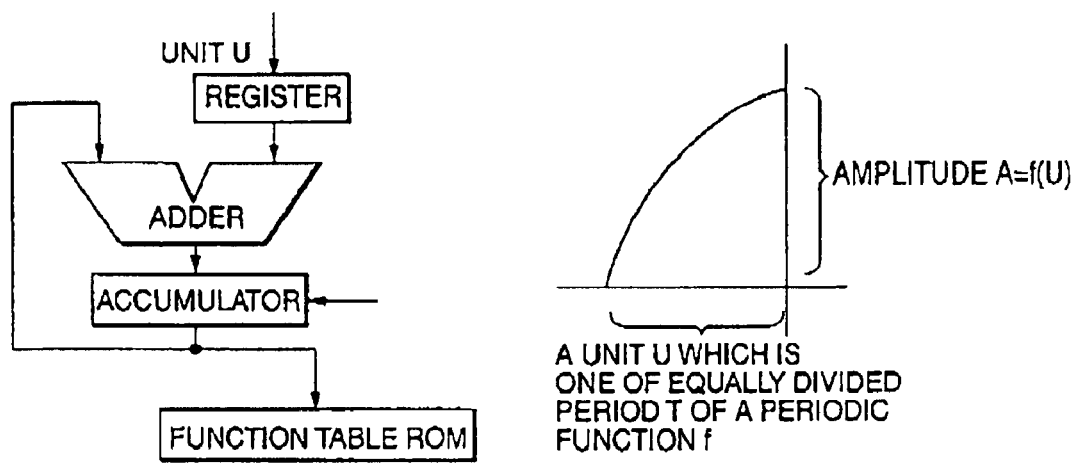
FIG.1A
PRIOR ART
FIG.1B
PRIOR ART
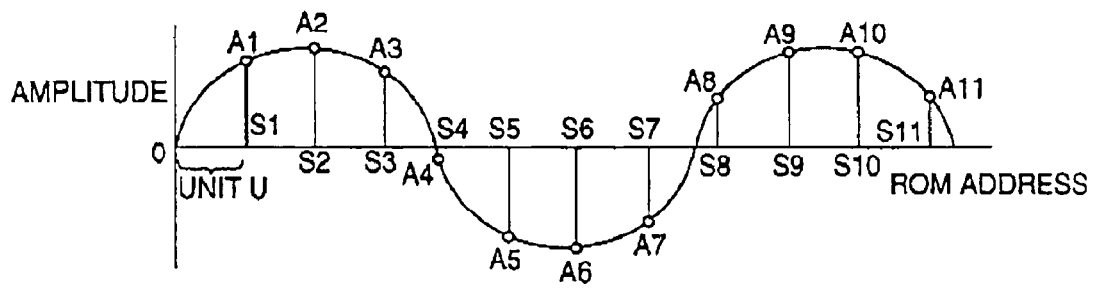
FIG.2
PRIOR ART

METHOD AND CIRCUIT FOR CALCULATING MULTIPLE OF UNIT VALUE AND GENERATING A PERIODIC FUNCTION

BACKGROUND OF THE INVENTION

This invention relates to a technique for generating a periodic function based on digital signals and, in particular, to a technique for generating a periodic function with reference to a function table. Such techniques are being used in the fields of, for example, audio, video, or communication signals processing.

According to one of such techniques known by the inventor, a unit angle stored in a register is repeatedly added in order to calculate a multiple of the unit angle and the amplitude of a periodic function corresponding to the multiple is referred to a function table.

Hereinbelow, description will be made with reference to FIG. 1 to a periodic function generating circuit based on such technique. First, a unit angle U, which is added to a multiple of the unit angle generated at previous clock, is stored in a register. Next, the unit angle U is added to a multiple $S^1$ of the unit angle U currently stored in an accumulator by an adder. Then, an updated multiple $S_2=S_1+U$ is stored in the accumulator. After that, an amplitude corresponding to the updated multiple $S_2$ is referred to a function table previously stored in a function table ROM. These steps are repeatedly executed to generate a series of amplitude values, and finally, the periodic function shown in FIG. 2 is generated.

According to the periodic function generating circuit, when the unit angle U is a mixed number, namely the sum of an integer and a fraction, each fraction of the multiples $S_1$, $S_2$, ..., $S_n$ is dropped. Consequently, error of the multiple $S_n$ gradually stacks up and increases. Furthermore, a repeating decimal is unavailable for the unit angle U because of its indefinite digits. If it is intended to set the sum of an integer and a repeating decimal as the unit angle U, the sum of the integer and an approximate value of the fraction is actually set as the unit angle U. In this case, the multiple $S_n$ includes an inevitable margin of error, This error is independent of the calculating accuracy of the adder.

As shown in FIG. 3, stacking of errors of the multiple $S_n$ causes phase difference between theoretical and output waveforms. The theoretical waveform drawn as a dotted line shows calculated one in theory. The output waveform drawn as a solid line shows one actually output from the periodic function generating circuit. It is noted that, as time passes, the phase difference stacks up and increases.

In order to restrict amount of the phase difference, the accumulator may be reset. In this case, a permitted limit of the phase difference is predetermined. When the multiple $S_n$ stored in the accumulator is about to reach at the permitted limit, the accumulator is reset and the value stored in the accumulator is updated to zero. However, this causes discontinuity of phase at the reset point. As shown in FIG. 4, though the phase difference between the theoretical and output waveforms is canceled, the output waveform before the reset point is separated from the output waveform after the reset point nevertheless. Recently, considerable ones of digital circuit systems require strict management of phase for a long time. Therefore, to reset the accumulator is inappropriate for such recent systems.

Techniques related to the present invention are, for example, described in a Japanese Patent Publication (JP-B) No. H 7-43620, namely 43620/1995, and Japanese unexamined patent publications JP-A) numbers 2000-215029 and 200-196690, namely 215029/2000 and 196690/12000, respectively.

SUMMARY OF THE INVENTION

The present invention is made on the background mentioned above and provides methods and devices for generating a multiple of a unit U and for generating a dependent variable of a periodic function whose independent variable is a multiple of a unit U.

According to one aspect of the invention, a unit U is separated an integer and a fraction. For example, the digital circuit for generating a dependent variable of a periodic function comprises an integer integrating section and a fraction integrating section.

The integer integrating section generates a periodic function of a multiple of the integer of a unit. The fraction integrating section generates a multiple of the fraction in order to add one to the output of the integer integrating section when the multiple of the fraction is equal to or larger than one.

In the fraction integrating section, the fraction is operated as a fractional expression, not as a decimal fraction. Therefore, the sum of an integer and a repeating decimal can be operated in the digital circuit without an approximation. The difference between the theoretical and output waveforms is held to a minimum.

According to another aspect of the invention, a method of generating a multiple of a unit U, N times U, by a digital circuit is provided, where U is a rational number and N is a natural number. The method comprises the following steps (1) to (5). (1) Where A, B and C are natural numbers, A>1, B>C and U=A+C/B, the values A, B and C are stored, (2) A multiple of A, N times A, and a multiple of C, N times C are generated. (3) The multiple of C is compared with the denominator B. (4) The multiple of A is modified according to the result of the comparing step (3). (5) The modified multiple of A is output as the multiple of U.

According to the method, a unit U is divided between an integer A and a fraction C/B, and a multiple of the integer and a multiple of the fraction are generated independently of each other. Consequently, the method can restrain at a minimum the difference between a multiple of a unit U theoretically calculated and a multiple of the unit U generated by the digital circuit.

When the result of the comparing step (3) is that the multiple of C is equal to or larger than the denominator B, the modifying step (4) may comprise the following steps (6) and (7). (6) The multiple of A is modified. (7) The denominator B is subtracted from the multiple of C.

Alternatively, when the result of the comparing step (3) is that the multiple of C is equal to or larger than a value MB, where M is a predetermined natural number, the modifying step (3) may comprise the following steps (8) and (9). (8) The multiple of A is modified. (9) The value MB is subtracted from the multiple of C.

In particular, it is notable that the C/B can represent a repeating decimal.

According to another aspect of the invention, a method of generating a dependent variable of a periodic function whose independent variable is a multiple of a unit U, N times U, by a digital circuit, where U is a rational number and N is a natural number is provided. The method comprises the following steps (10) to (14). (10) Values A, B and C are stored, where A, B and C are natural numbers, A>1, B>C and U=A+C/B. (11) A multiple of A, N times A, and a multiple of C, N times C are generated. (12) The multiple of C is compared with the denominator B. (13) The multiple of A is modified according to the result of the comparing step (12). And (14) a value corresponding to the modified multiple of A is extracted from a function table as the dependent variable corresponding to the multiple of U. The function table represents relationship between the dependent and independent variables of the periodic function and is previously stored in a memory device.

When the result of the comparing step (12) is that the multiple of C is equal to or larger than the denominator B, the modifying step (13) may comprise the following steps (15) and (16). (15) The multiple of A is modified. (16) The denominator B is subtracted from the multiple of C.

Alternatively, when the result of the comparing step (12) is that the multiple of C is equal to or larger than a value MB, where M is a predetermined natural number, the modifying step (13) may comprise the following steps (17) and (18). (17) The multiple of A is modified. (18) The value MB is subtracted from the multiple of C.

In particular, it is notable that the C/B can represent a repeating decimal.

According to another aspect of the invention, a digital circuit for generating a multiple of a unit U, N times U; where U is a rational number and N is a natural number is provided. The digital circuit comprises first, second and third registers, first and second calculating circuits, a subtractor, and a modifying circuit. The first, second and third registers store values A, B and C, respectively, where A, B and C are natural numbers, A>1, B>C and U=A+C/B. The first and second calculating circuits generate a multiple of A, N times A, and a multiple of C, N times C, respectively. The subtractor generates a difference between the multiple of C and the denominator B. The modifying circuit modifies the multiple of A according to the output of the subtractor. The first calculating circuit outputs the modified multiple of A as the multiple of U.

The first calculating circuit may comprise an accumulator and an adder that adds the value stored in the first register to the value stored in the accumulator. In this case, the modifying circuit directs the adder to add +1 to its output when the output of the subtractor represents that the multiple of C is equal to or larger than the denominator B.

The first calculating circuit may comprise an accumulator and an adder. In this case, the modifying circuit may comprise an adjusting circuit for adjusting the value stored in the first register with reference to a predetermined value, and a selector for selecting one of the outputs of the adder and the adjusting circuit according to the output of the subtractor. Alternatively, the modifying circuit may comprise a fourth register for storing a value that is different from the value A, and a selector for selecting one of the values stored in the first and fourth registers according to the output of the subtractor. The adder adds the value stored in the accumulator to the output of the selector.

In particular, it is notable that the C/B can represent a repeating decimal.

According to another aspect of the invention, a digital circuit for generating a dependent variable of a periodic function whose independent variable is a multiple of a unit U, N times U, where U is a rational number and N is a natural number is provided. The digital circuit comprises first, second and third registers, first and second calculating circuits, a subtractor, a modifying circuit and a memory device. The first, second and third registers store values A, B and C respectively, where A, B and C are natural numbers, A>1, B>C and U=A+C/B. The first and second calculating circuits generate a multiple of A, N times A, and a multiple of C, N times C, respectively. The subtractor generates a difference between the multiple of C and the denominator B. The modifying circuit modifies the multiple of A according to the output of the subtractor, The memory device stores a function table which represents relationship between the dependent and independent variables of the periodic function, and outputes a value corresponding to the modified multiple of A on the function table as the dependent variable corresponding to the multiple of U.

The first calculating circuit may comprise an accumulator and an adder that adds the value stored in the first register to the value stored in the accumulator. In this case, the modifying circuit directs the adder to add +1 to its output when the output of the subtractor represents that the multiple of C is equal to or larger than the denominator B.

The first calculating circuit may comprise an accumulator and an adder. In this case, the modifying circuit may comprise an adjusting circuit for adjusting the value stored in the first register with reference to a predetermined value, and a selector for selecting one of the outputs of the adder and the adjusting circuit according to the output of the subtractor. Alternatively, the modifying circuit may comprise a fourth register for storing a value that is different from the value A, and a selector for selecting one of the values stored in the first and fourth registers according to the output of the subtractor. The adder adds the value stored in the accumulator to the output of the selector.

In particular, it is notable that the C/B can represent a repeating decimal.

BRIEF DESCRIPTION OF THE DRAWING

FIG. 1A shows a block diagram of a related digital circuit known by the inventor, FIG. 1B illustrates a pair of a dependent variable and the independent variable corresponding to the dependent variable stored in the function table ROM of the related digital circuit;

FIG. 2 illustrates a periodic function generated by the related digital circuit;

DESCRIPTION OF THE PREFERRED EMBODIMENTS

Figure 5:
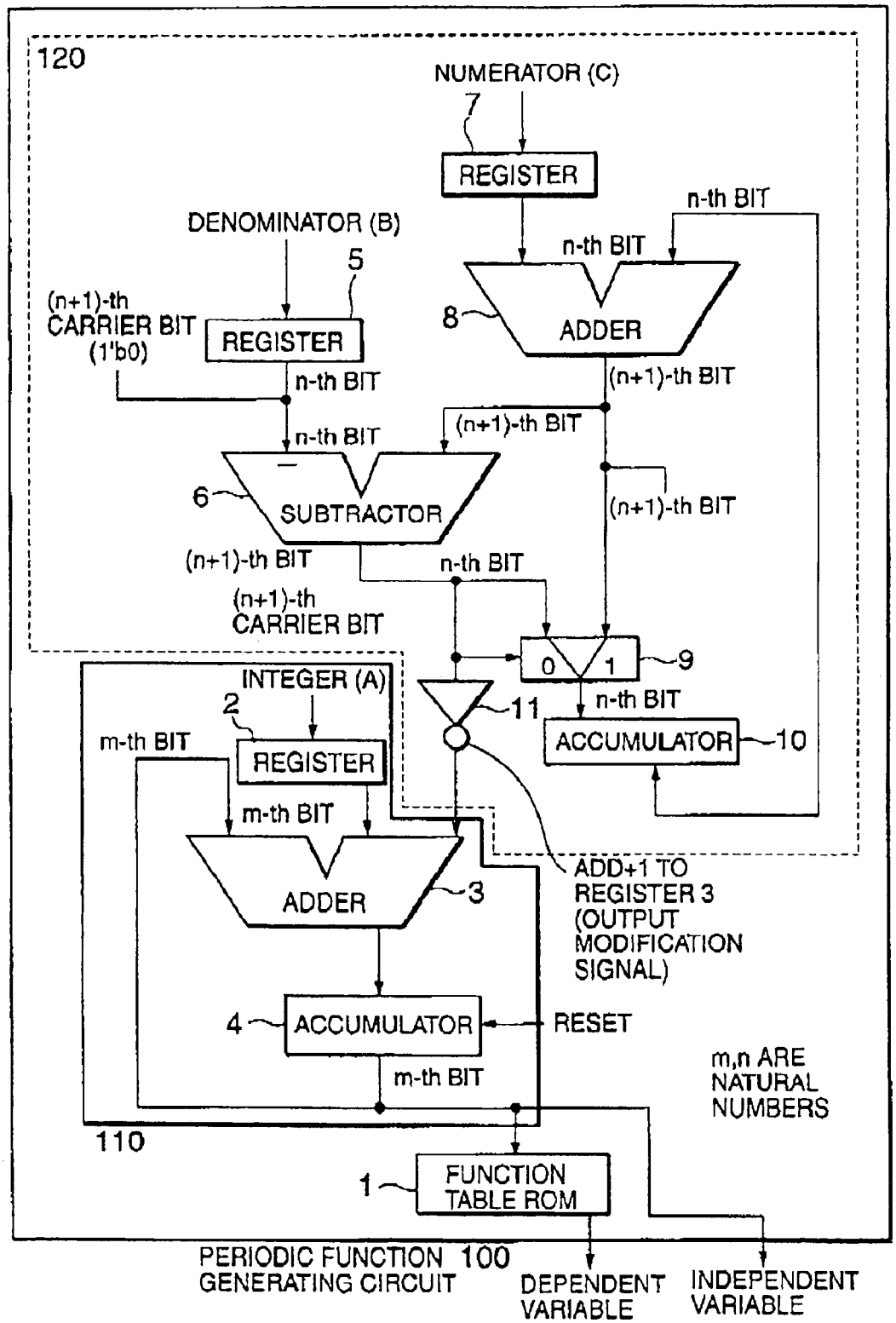
FIG. 5 shows a block diagram of a periodic function generating circuit 100, a first embodiment of the present invention.

Description will be made about a basic idea of the present invention with reference to a first embodiment of the present invention, a periodic function generating circuit 100. As shown in FIG. 5, the periodic function generating circuit 100 includes an integer integrating section 110, a fraction integrating section 120 and a function table ROM 1. The function table ROM 1 stores a function table represents relationship between dependent variables and independent variables of a periodic function.

According to the periodic function generating circuit 100, each of dependent variables of a periodic function are generated as a multiple of a unit U, namely, N times U, where U is a rational number and N is a natural number.

Previously, the unit U is transformed into a sum of a natural number A and a fractional expression C/B, where values B and C are natural numbers.

In order to generate a multiple of the unit U, the integer integrating section 110 generates a series of multiples A, 2A, ..., NA, ... and the fraction integrating section 120 synchronously generates a series of multiples C, 2C, ..., NC, ....

When the multiple of C is equal to or larger than a predetermined natural number, the fraction integrating section 120 directs the integer integrating section 110 to modify the corresponding multiple of A. In this case, the integer integrating section 110 outputs modified multiple of A as a multiple of the unit U.

On the other hand, when the multiple of C becomes less than the predetermined natural number, the integer integrating section 110 outputs the multiple A as a multiple of the unit U without modification.

In response to the multiple of the unit U, the function table ROM 1 outputs a independent variable corresponding to the multiple of the unit U.

Next, detailed description will be made about the first embodiment of the present invention, the periodic function generating circuit 100.

The integer integrating section 110 includes a register 2, an adder 3 and an accumulator 4. The adder 3 usually generates a sum of a value stored in the register 2 and a value stored in the accumulator 4, and updates the value stored in the accumulator 4 to the sum at every clock timing. The value stored in the accumulator 4 is provided to the function table ROM 1 in order to output the value corresponding to the value stored in the accumulator 4.

The fraction integrating section 120 generates a multiple of the fraction of the unit U. The fraction is a number that can be represented in a fractional expression. When the multiple of the fraction is equal to or larger than a predetermined integer, the fraction integrating section 120 outputs a modification signal to the integer integrating section 110.

The modification signal directs the integer integrating section 110 to modify the dependent variable. For example, when the multiple of the fraction is less than one, the adder 3 adds a value stored in the register 2 and a value stored in the accumulator 4. On the other hand, when the multiple of the fraction is equal to or larger than one, the adder 3 adds a value stored in the register 2, a value stored in the accumulator 4 and +1.

As a result, the integer integrating section 110 outputs a modified multiple of the unit U when the multiple of the fraction is equal to or larger than one, or outputs the multiple of the unit U when the multiple of the fraction is less than one. Consequently, errors of the dependent variables output by the periodic function generating circuit 100 can be restricted within the minimum bit available for the register 2.

In this manner, the fraction integrating section 120, which characterizes this embodiment, generates the modification signal to the integer integrating section 110 when phase difference between theoretical and generated waveforms grows equal to or larger than the minimum bit. Consequently, according to the periodic function generating circuit 100, stack of the phase difference is avoidable.

Figure 6:
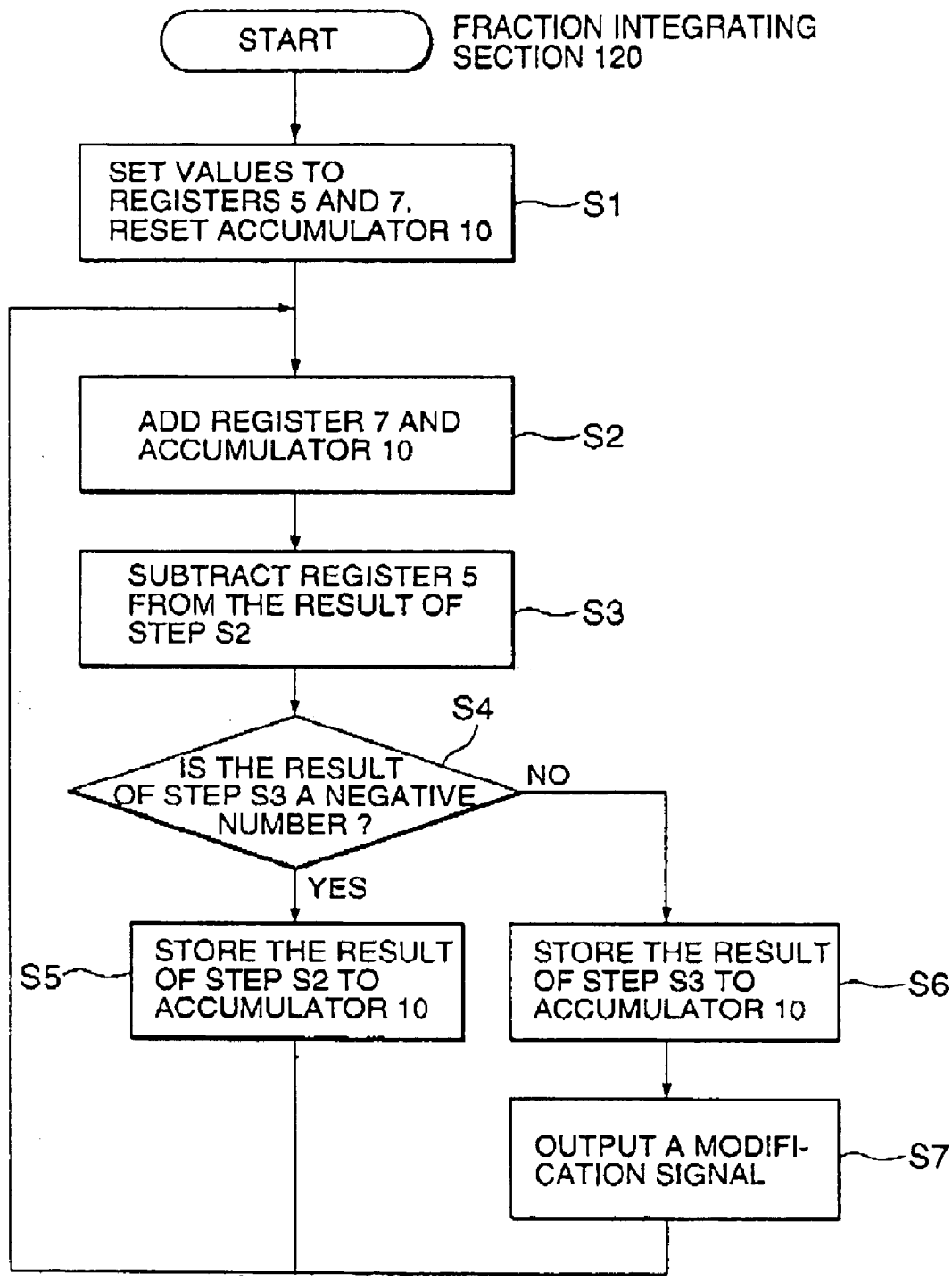
FIG. 6 shows a flowchart for describing operation of a fraction integrating section 120 included in the periodic function generating circuit 100.
Figure 7:
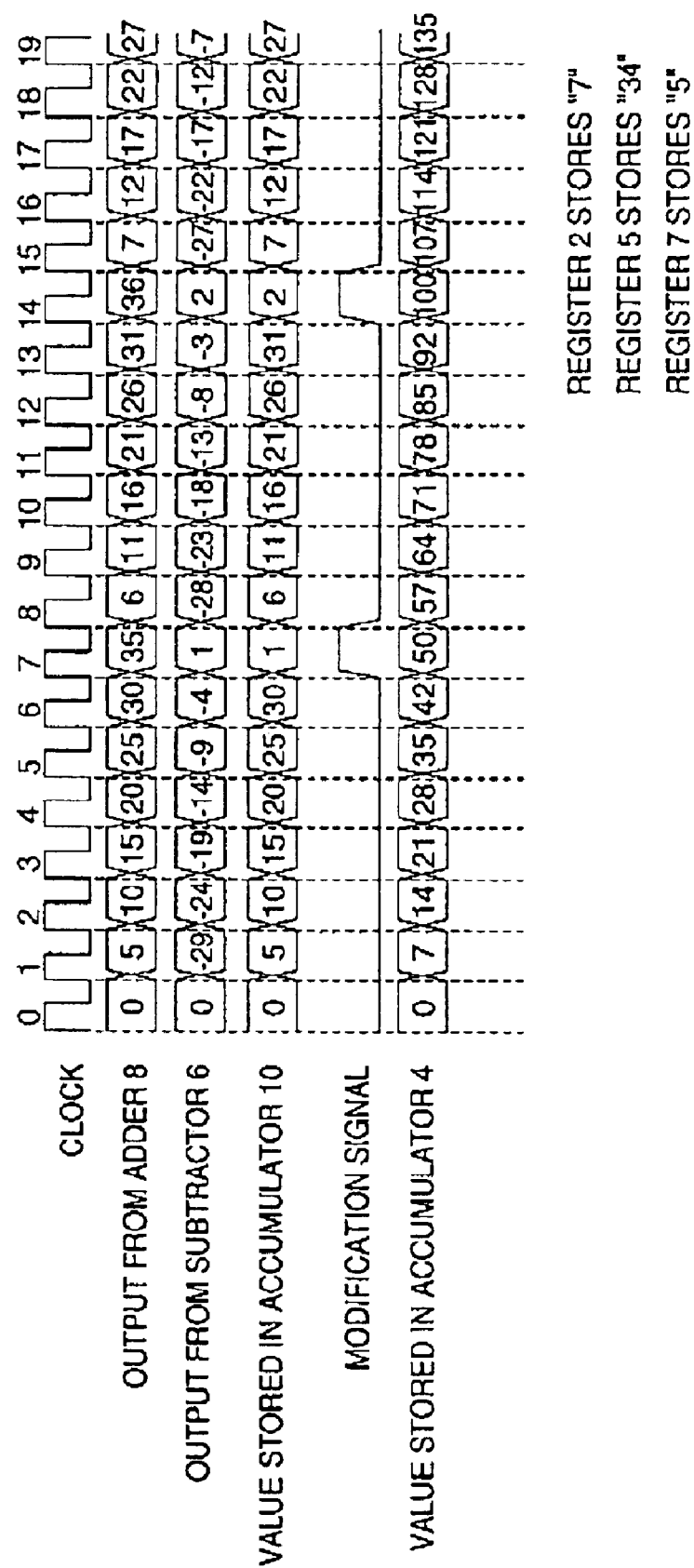
FIG. 7 shows a timing chart for describing relation between a clock signal and output signals from elements of the periodic function generating circuit 100.

Operation of the fraction integrating section 120 will be further described below with reference to FIG. 6 and FIG. 7.

Previously, the unit U is expressed as a sum of an integer A and a fraction C/B that is less than one, where U is a rational number, A, B and C are natural numbers. The denominator B is set to the register 5, the numerator C is set to the register 7, and the accumulator 10 is reset (STEP S1). It is assumed that the denominator B=34 and the numerator C=5 to draw each rectangular wave shown in FIG. 7. Numerals 0, 1, 2, ..., 19 are given above rectangular pulses of the clock signal as a matter of convenience. Hereinafter, clock timings when rectangular pulses rise are called as 0th clock, 1st clock, 2nd clock, ..., 19th clock.

The adder 8 adds the numerator C stored in the register 7 and the value stored in the accumulator 10 (STEP S2). The numerator C is equal to 5 and, at the 1st clock, the accumulator 10 stores 0. Consequently, the adder 8 outputs a sum 5+0=5.

On the other hand, the subtractor 6 subtracts the value stored in the register 5 from the output of the adder 8 (STEP S3), The register 5 stores the denominator B=34. The output of the adder 8 is 5 at the 1st clock. Consequently, the subtractor 6 generates the difference 5−34=29 at the 1st clock.

After STEP S3, if the output of the subtractor 6 is negative, then the output of the adder 8 is stored in the accumulator 10 (STEPS S4, S5). In this case, the inverter 11 outputs zero to the integer integrating section 110, but does not output the modification signal.

While the subtractor 6 outputs negative at STEP S4, a loop operation between STEP 1 to 5 is repeatedly performed every clock. In the loop operation, the accumulator 10 stacks up the numerator C. The loop operation is performed from the 1st to 6th clocks in FIG. 7. In these clocks, the accumulator 10 is stacking up the numerator C and stores 0, 5, 10, ..., 30 one after another, as errors for generating a multiple of unit U.

After repeating the loop operation STEPS S1~S5 several times, the output of the adder 8 exceeds the denominator B stored in the register 5 and the output of the subtractor 6 turns to positive. This means that the multiple of the fraction is larger than one. In this case, the selector 9 selects the subtractor 6, instead of the adder 8, in order to store the output of the subtractor 6 to the accumulator 10 (STEPS S4, S6). At the 7th clock in FIG. 7, since the adder 8 outputs 35, the subtractor 6 outputs 35−34=1>0. Simultaneously, the inverter 11 provides the modification signal to the integer integrating section 110 (STEP S7).

Figure 8:
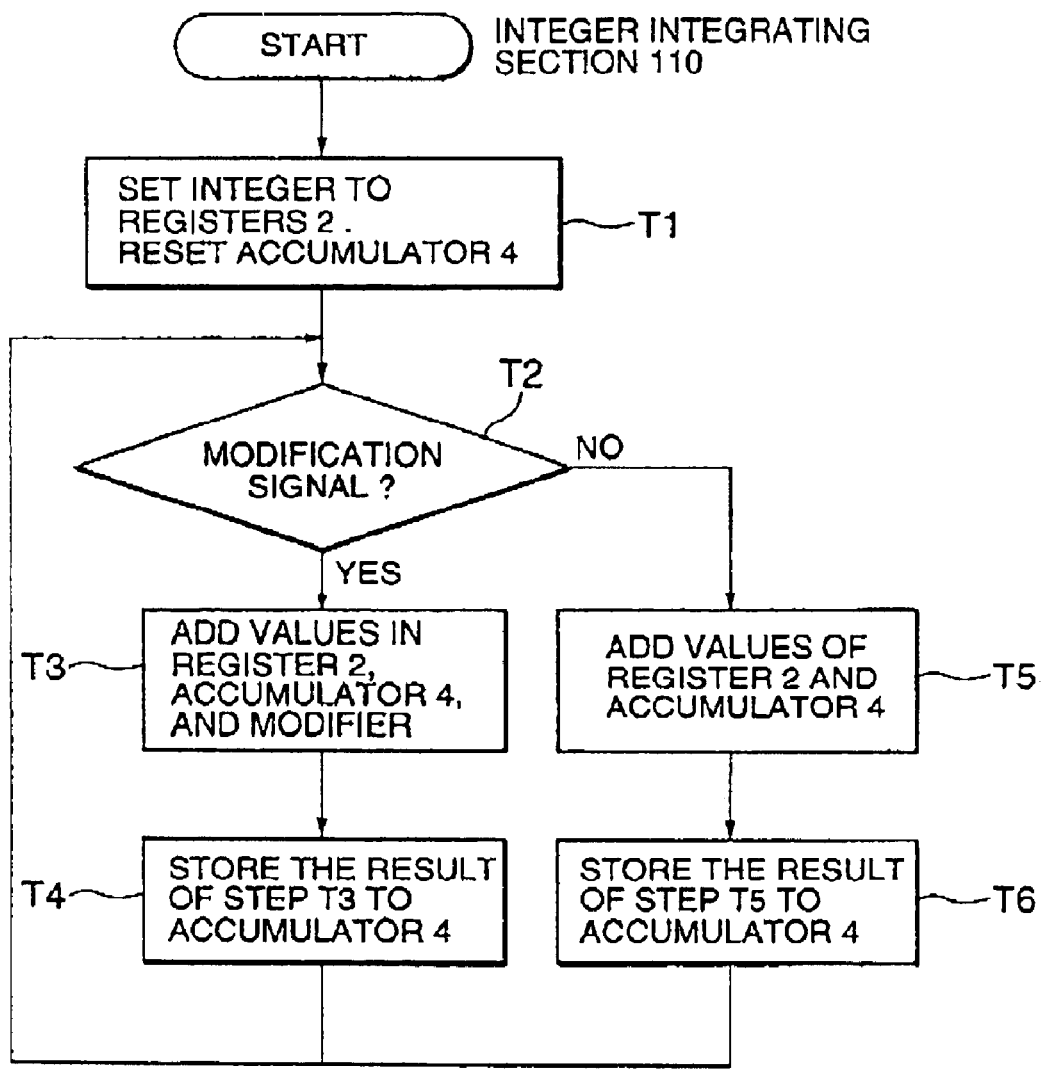
FIG. 8 shows a flowchart for describing operation of an integer integrating section 110 included in the periodic function generating circuit 100.

Next, operation of the integer integrating section 110 will be further described below with reference to FIG. 5, FIG. 7 and FIG. 8.

First, the integer A is set to the register 2 and the accumulator 4 is reset (STEP T1). In the timing chart shown in FIG. 7, the integer A is 7 and the register 2 stores 7. The integer integrating section 110 performs the following operation every clock.

When the modification signal is not sent from the fraction integrating section 120 (STEP T2), the adder 3 generates a sum of the value stored in the register 2 and the value stored in the accumulator 4 (STEP T3), and updates the accumulator 4 to the sum (STEP T4). Since the register 2 stores 7 and the accumulator 4 stores zero at the 1st clock in FIG. 7, the adder 3 outputs 7+0=7. From the 2nd to 6th clock, the value stored in the accumulator 4 increases 7 per one clock.

On the other hand, when the modification signal is sent from the fraction integrating section 120 (STEP T2), the adder 3 generates a sum of the value stored in the register 2, the value stored in the accumulator 4, and a modifier (STEP T5). The modifier is predetermined as a natural number that is added at STEP T5 in order to adjust the sum generated by the adder 3.

In the case of this embodiment, the modifier is 1. For example, as shown in FIG. 7, the accumulator 4 stores 42 at the 6th clock. Therefore, the adder 3 generates the sum of 7+42+1=50 at the 7th clock. From the 1st to 6th clock, the value stored in accumulator 4 gains +7. On the other hand, at the 7th clock, the value gains +8. The modification mentioned above corrects error of the multiple of the unit U.

Figure 3:
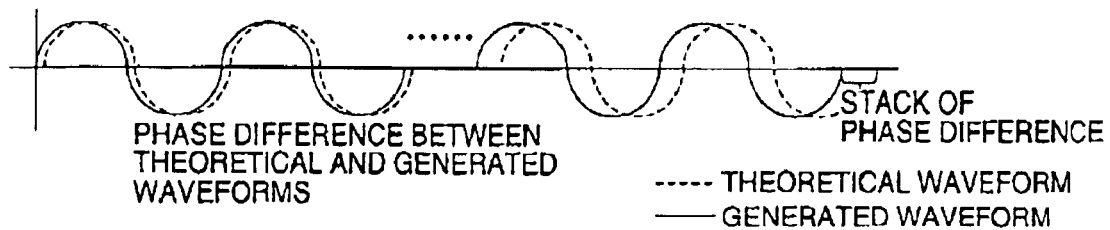
FIG. 3 illustrates phase difference between a waveform theoretically calculated and a waveform actually generated by the related digital circuit, and stacking-up of the phase difference.
Figure 4:
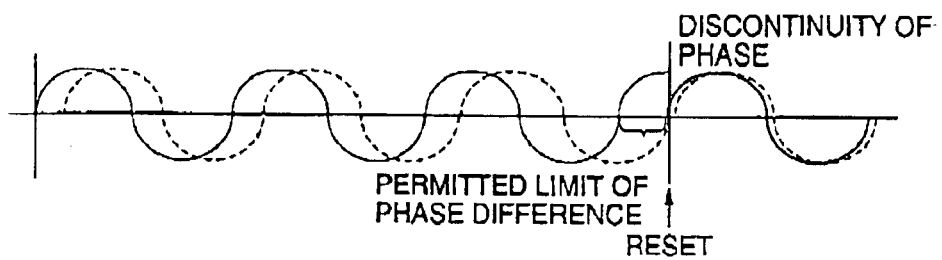
FIG. 4 illustrates discontinuity between phase of the theoretical waveform and the phase of generated waveform, and cancellation of the discontinuity by the related digital circuit.
Figure 9:
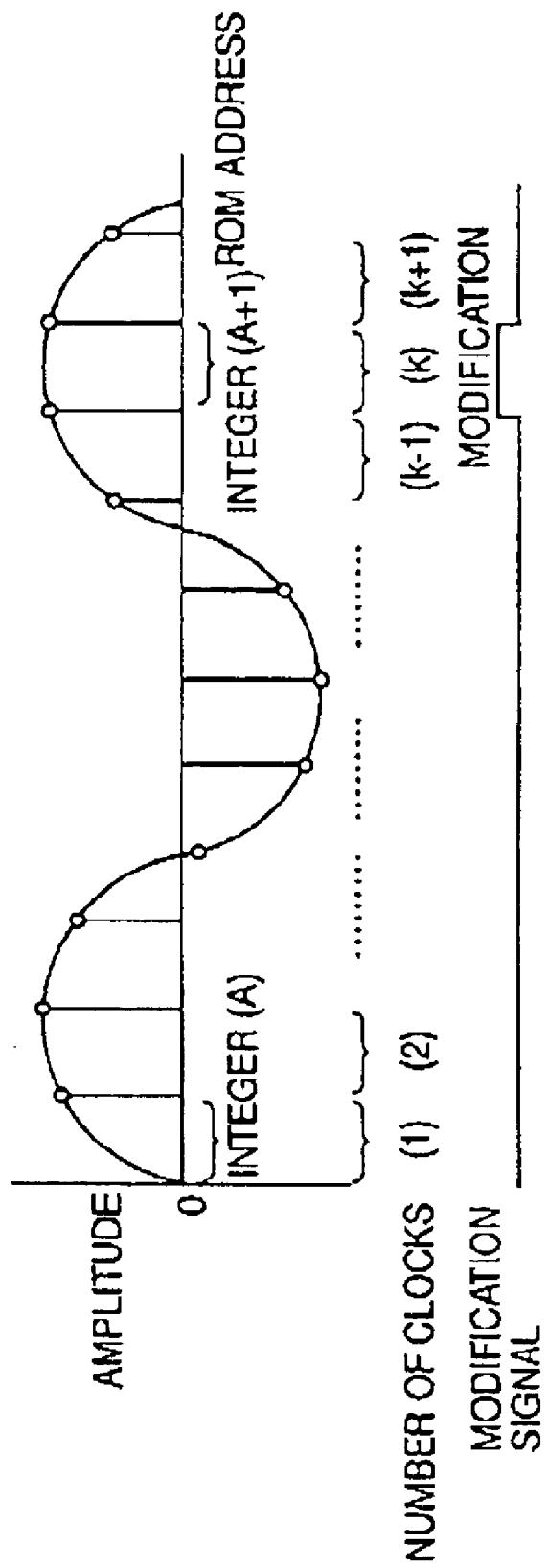
FIG. 9 shows a graph of a periodic function generated by the periodic function generating circuit 100 in order to describe adjustment of a dependent variable of the periodic function.

Accordingly, dependent variables output from the integer integrating section 110 to the function table ROM 1 is modified when the amount of the error exceeds one bit. As shown in FIG. 9, if the amount first exceeds one bit at a k-th clock (k is a natural number, and for example, is 7th clock in FIG. 7), then from 1st to (k−1)th clock, the fraction integrating section 120 does not output the modification signal, and the integer integrating section 110 repeatedly generates a sum of the sum generated at previous clock and the value A. Further, at k-th clock, the fraction integrating section 120 outputs the modification signal to the integer integrating section 110, and in response to the modification signal, the integer integrating section 110 generates a sum of the sum generated at previous clock and the integer A+1. Therefore, dependent variables referred by the function table ROM 1 is modified when the amount of the error exceeds one bit. Consequently, the periodic function generating circuit 100 can avoid stack of phase difference as shown in FIG. 3 and discontinuity of phase as shown in FIG. 4.

In the periodic function generating circuit 100, instead of immediately generating a multiple of a rational number, first, the rational number is expressed as a sum of an integer and a fraction which is less than one, next, a multiple of the integer and a multiple of the numerator of the fraction are generated, then the multiple of the integer is modified according to the multiple of the fraction and output as the multiple of the rational number.

Each of the multiple of the integer and the multiple of the numerator is free from errors. Therefore, the periodic function generating circuit 100 can generate the multiple of the rational number, namely a dependent variable, with error less than one.

Further, the integer is modified when the multiple of the fraction becomes larger than natural numbers. Therefore, the periodic function generating circuit 100 can avoid discontinuity of phase. Consequently, the periodic function generating circuit 100 can generate a periodic function with high accuracy for a long time.

Figure 10:
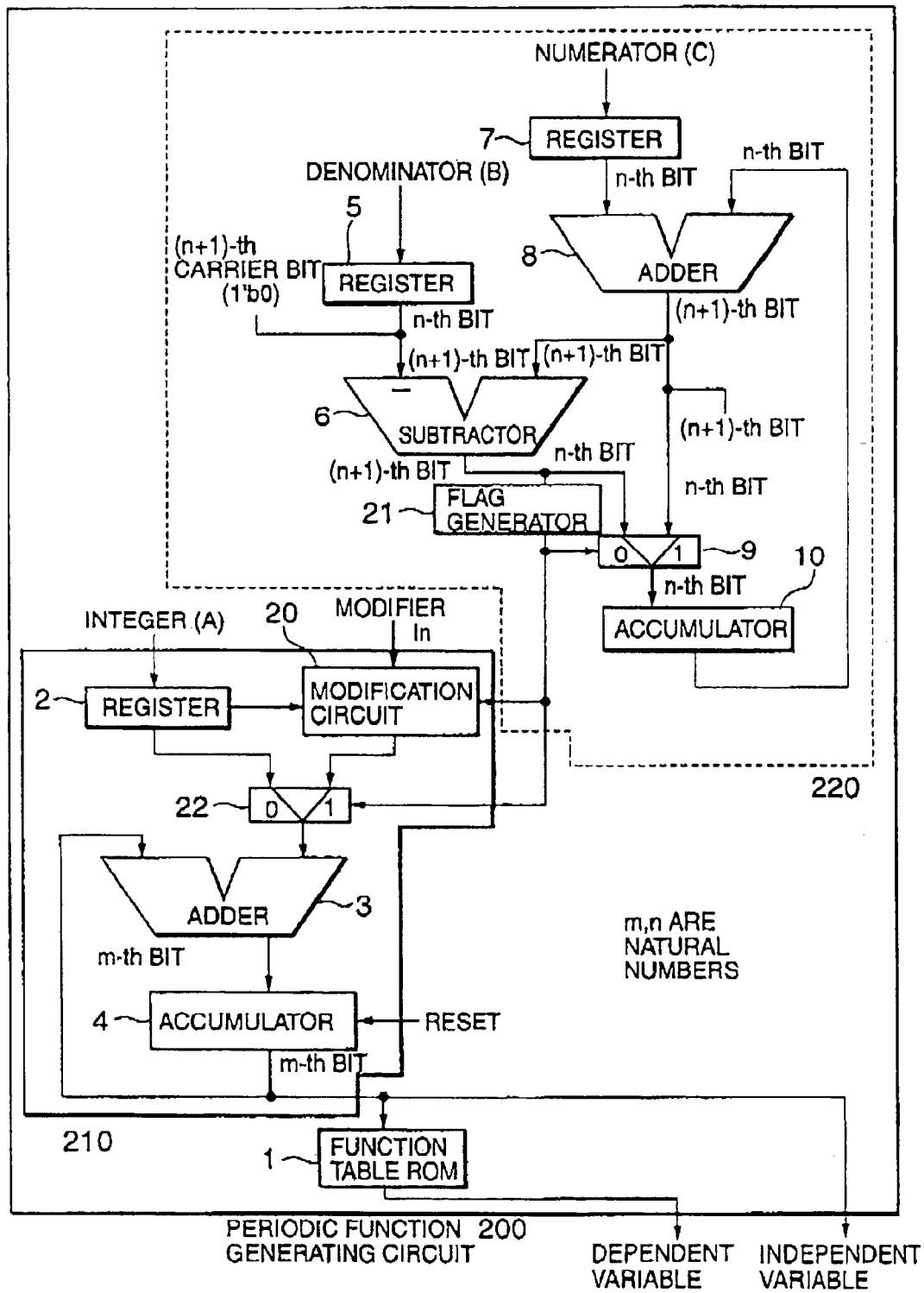
FIG. 10 shows a block diagram of a periodic function generating circuit 200, a second embodiment of the present invention.

Next, description will be made about a second embodiment of the present invention, a periodic function generating circuit 200 with reference to FIG. 10.

According to the periodic function generating circuit 100, the inverter 11 generates the modification signal when the multiple of the fraction becomes larger than a natural number. On the other hand, according to the periodic function generating circuit 200, a flag generator 21 generates the modification signal when the multiple of the fraction becomes larger than a multiple of a natural number. For example, the flag generator 21 generates the modification signal when the multiple of the fraction becomes larger than 2, 4, 6, . . . if the natural number is two. In another embodiment, a multiple of another natural number, instead of the multiple of two, may be available for comparing with the multiple of the fraction.

According to the first embodiment, when the modification signal occurs, the adder 3 adds the modifier to a sum of the integer A and the value stored in the accumulator 4 at previous clock. On the other hand, according to the periodic function generating circuit 200, a modification circuit 20 modifies the integer A in accordance with the output of the flag generator 21. Then the adder 3 adds the modified integer A to the value stored in the accumulator 4 at previous clock. The modification circuit 20 executes addition or subtraction between the integer A stored in the register 2 and a modifier set from outside of the modification circuit 20 The modifier is referred when the modification signal occurs.

The amount of the modifier is decided according to the natural number whose multiple compared with the multiple of the fraction in order to generate the modification signal by the flag generator 21.

Further, according to the periodic function generating circuit 100, the modification signal is input to the adder 3. On the other hand, according to the periodic function generating circuit 200, the flag generator 21 generates modification signals and inputs the modification signal to the modification circuit 20 and a selector 22. The selector 22 selects one of the outputs from the register 2 and from the modification circuit 20 in accordance with the modification signal.

As mentioned above, the periodic function generating circuit 200 modifies the multiple of the integer A when a multiple of the numerator C becomes larger than a multiple of two. As shown in FIG. 7, the inverter 11 generates a modification signal at 7th and 14th clocks. On the other hand, as shown in FIG. 11, the flag generator 21 generates a modification signal only at 14th clock.

Figure 11:
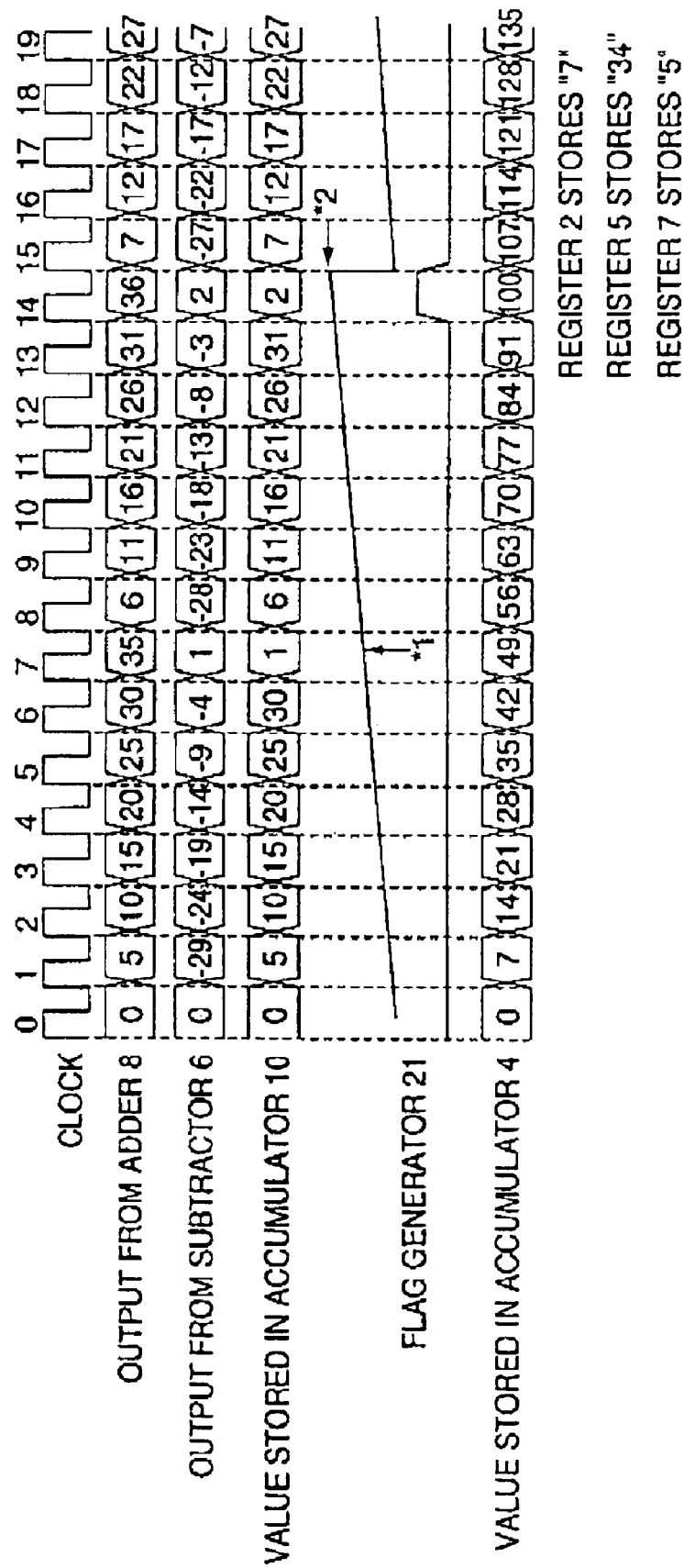
FIG. 11 shows a timing chart for describing relation between a clock signal and output signals from elements of the periodic function generating circuit 200.

At 14th clock in FIG. 11, the modification circuit 20 generates a sum of the integer A and the modifier (7+2=9), and the adder 3 adds the sum to the value stored in the accumulator 4 at the previous clock (91+9=100). Therefore, the value stored in the accumulator 4 grows 49−42=7 at 7th clock, and on the other hand, grows 100−91=9 at 14th clock.

Figure 12:
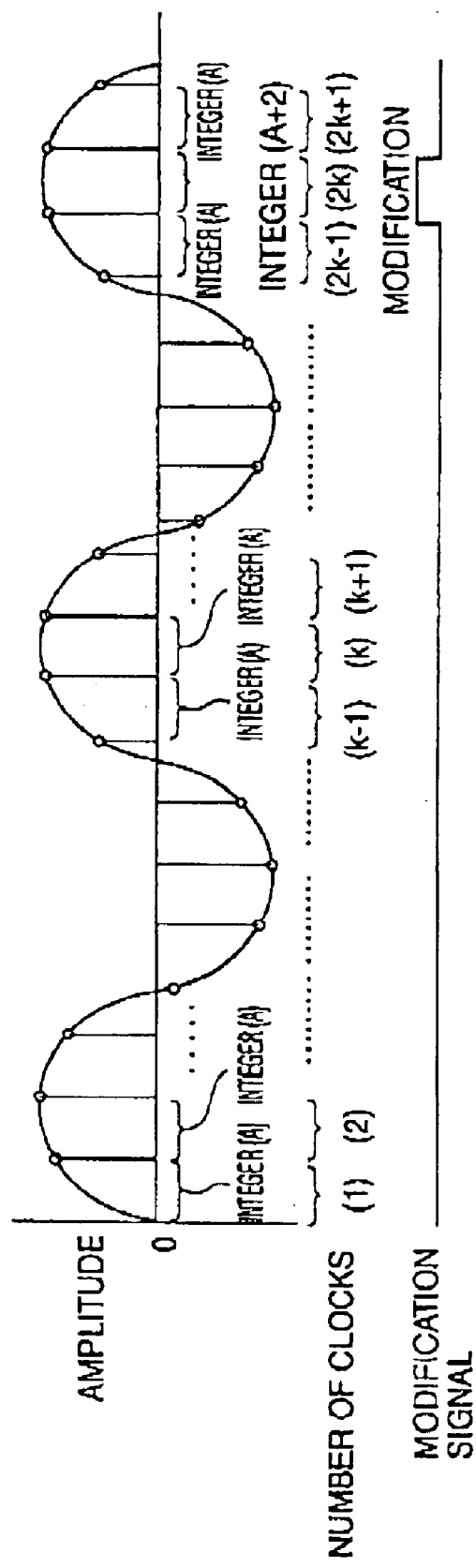
FIG. 12 shows a graph of a periodic function generated by the periodic function generating circuit 200 in order to describe adjustment of a dependent variable of the periodic function.

Consequently, the periodic function generating circuit 200 generates a periodic function as shown in FIG. 12. This shows that the second embodiment is useful when frequency of modification should be low.

Figure 13:
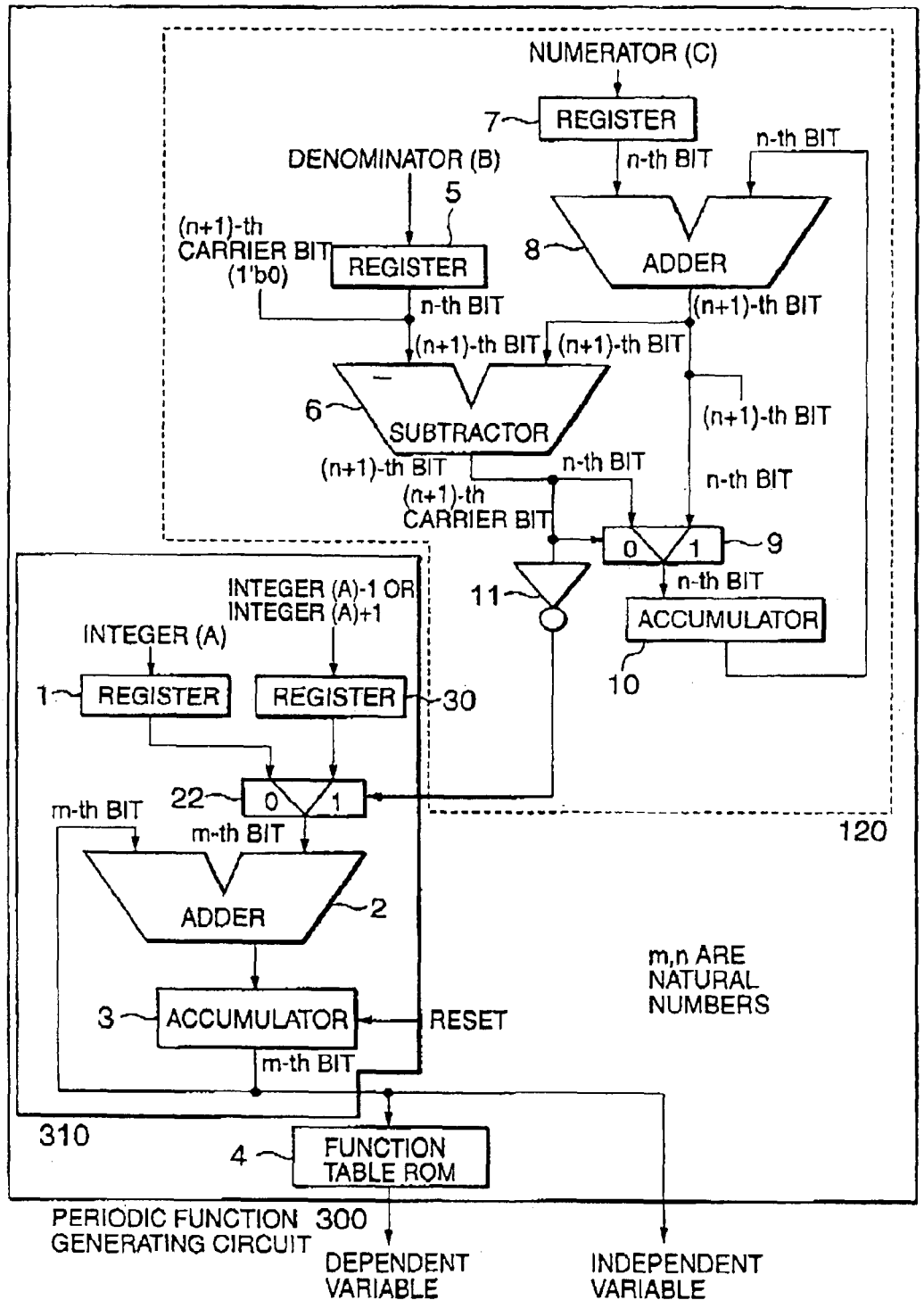
FIG. 13 shows a block diagram of a periodic function generating circuit 300, a third embodiment of the present invention.

Next, description will be made about a third embodiment of the present invention, a periodic function generating circuit 300 with reference to FIG. 13.

According to the second embodiment, the modification circuit 20 generates the modified integer A at every clock when the modification signal occurs. If the frequency of the modification signal is predetermined, the amount of the modified integer A can thereby be predetermined and be fixed.

The periodic function generating circuit 300 includes a register 30, instead of the modification circuit 20. The register 30 stores the modified integer A The adder 3 receives the alternative of the integer A stored in the register 2 and the modified integer A stored in the register 30. The alternative is selected by a selector 22 according to the inverter 11. The periodic function generating circuit 300 includes the fraction integrating section 120, which is the same one included in the periodic function generating circuit 100. Therefore, one modification signal occurs when a multiple of the fraction is larger than a natural number.

According to the periodic function generating circuit 100, the modified integer A is always larger than the integer A. On the other hand, according to the periodic function generating circuit 300, the modified integer A is either smaller or larger than the integer A.

If the periodic function generating circuit 300 included the fraction integrating section 220 instead of the fraction integrating section 120, the selector 22 would output the modified integer A when a multiple of the numerator C becomes larger than a multiple of two. In this case, the modified integer A stored in the register 30 should be decided in consideration to the frequency of the modification signal.

While this invention has thus far been described in conjunction with a few embodiments thereof, it will be readily possible for those skilled in the art to put the this invention into various other manners.

What is claimed is:

1. A method of generating a multiple of a unit U, N times U, by a digital circuit, where U is a rational number and N is a natural number, comprising the steps of:

providing at least one memory device, a first circuit, and a second circuit;

storing values A, B and C in the memory device, where A, B and C are natural numbers, A>1, B>C and U=A+C/B;

generating a multiple of C, N times C by the first circuit;

comparing the value B with the multiple of C by the first circuit;

generating a multiple of A, N times A by the second circuit;

modifying, by the second circuit, the multiple of A according to the output of the first circuit; and outputting the modified multiple of A as the multiple of U from the second circuit.

2. The method claimed in claim 1, wherein when the result of the comparing step is that the multiple of C is equal to or larger than the value B, the modifying step comprising the steps of:

modifying the multiple of A; and subtracting the value B from the multiple of C using the first circuit.

3. The method claimed in claim 1, wherein when the result of the comparing step is that the multiple of C is equal to or larger than a value MB, where M is a predetermined natural number, the modifying step comprising the steps of:

modifying the multiple of A; and subtracting the value MB from the multiple of C using the first circuit.

4. The method claimed in claim 1, wherein the C/B represents a repeating decimal.

5. A method of generating a dependent variable of a periodic function whose independent variable is a multiple of a unit U, N times U, by a digital circuit, where U is a rational number and N is a natural number, comprising the steps of:

providing at least one memory device, a first circuit, and a second circuit;

storing values A, B, and C in the memory device, where A, B, and C are natural numbers, A>1, B>C and U=A+C/B;

generating a multiple of C, N times C by the first circuit;

comparing the value B with the multiple of C by the first circuit;

generating a multiple of A, N times A by the second circuit;

modifying, by the second circuit, the multiple of A according to the output of the first circuit; and extracting a value corresponding to the modified multiple of A from a function table, which represents relationship between the dependent and independent variables of the periodic function and is previously stored in the memory device, as the dependent variable corresponding to the multiple of U.

6. The method claimed in claim 5, wherein when the result of the comparing step is that the multiple of C is equal to or larger than the value B, the modifying step comprising the steps of:

modifying the multiple of A; and subtracting the value B from the multiple of C using the first circuit.

7. The method claimed in claim 5, wherein when the result of the comparing step is that the multiple of C is equal to or larger than a value MB, where M is a predetermined natural number, the modifying step comprising the steps of:

modifying the multiple of A; and subtracting the value MB from the multiple of C using the first circuit.

8. The method claimed in claim 5, wherein the C/B represents a repeating decimal.

9. A digital circuit for generating a multiple of a unit U, N times U, where U is a rational number and N is a natural number, comprising:

first, second and third registers for storing values A, B and C, respectively, where A, B and C are natural numbers, A>1, B>C and U=A+C/B;

first and second calculating circuits for generating a multiple of A, N times A, and a multiple of C, N times C, respectively;

a subtractor for generating a difference between the multiple of C and the value B; and a modifying circuit for modifying the multiple of A according to the output of the subtractor, wherein the first calculating circuit outputs the modified multiple of A as the multiple of U.

10. The digital circuit claimed in claim 9, wherein:

the first calculating circuit comprises an accumulator and an adder that adds the value stored in the first register to the value stored in the accumulator; and the modifying circuit directs the adder to add +1 to its output when the output of the subtractor represents that the multiple of C is equal to or larger than the value B.

11. The digital circuit claimed in claim 9, wherein:

the first calculating circuit comprises an accumulator and an adder;

the modifying circuit comprises an adjusting circuit for adjusting the value stored in the first register with reference to a predetermined value, and a selector for selecting one of the outputs of the adder and the adjusting circuit according to the output of the subtractor; and the adder adds the value stored in the accumulator to the output of the selector.

12. The digital circuit claimed in claim 9, wherein:

the first calculating circuit comprises an accumulator and an adder;

the modifying circuit comprises a fourth register for storing a value which is different from the value A, and a selector for selecting one of the values stored in the first and fourth registers according to the output of the subtractor; and the adder adds the value stored in the accumulator to the output of the selector.

13. The digital circuit claimed in claim 9, wherein the C/B represents a repeating decimal.

14. A digital circuit for generating a dependent variable of a periodic function whose independent variable is a multiple of a unit U, N times U, where U is a rational number and N is a natural number, comprising:

first, second and third register for storing values A, B and C respectively, where A, B and C are natural numbers, A>1, B>C and U=A+C/B;

first and second calculating circuits for generating a multiple of A, N times A, and a multiple of C, N times C, respectively;

a subtractor for generating a difference between the multiple of C and the value B;

a modifying circuit for modifying the multiple of A according to the output of the subtractor; and a memory device for storing a function table which represents relationship between the dependent and independent variables of the periodic function and for outputting a value corresponding to the modified multiple of on the function table as the dependent variable corresponding to the multiple of U.

15. The digital circuit claimed in claim 14, wherein:

the first calculating circuit comprises an accumulator and an adder that adds the value stored in the first register to the value stored in the accumulator; and the modifying circuit directs the adder to add +1 to its output when the output of the subtractor represents that the multiple of C is equal to or larger than the value B.

16. The digital circuit claimed in claim 14, wherein:

the first calculating circuit comprises an accumulator and an adder;

the modifying circuit comprises an adjusting circuit for adjusting the value stored in the first register with reference to a predetermined value, and a selector for selecting one of the outputs of the adder and the adjusting circuit according to the output of the subtractor; and the adder adds the value stored in the accumulator to the output of the selector.

17. The digital circuit claimed in claim 14, wherein:

the first calculating circuit comprises an accumulator and an adder;

the modifying circuit comprises a fourth register for storing a value which is different from the value A, and a selector for selecting one of the values stored in the first and fourth registers according to the output of the subtractor; and the adder adds the value stored in the accumulator to the output of the selector.

18. The digital circuit claimed in claim 14, wherein the C/B represents a repeating decimal.

* * * * *